UNITED STATES PATENT OFFICE.

ALEXANDER C. McKNIGHT, OF PHILADELPHIA, PENNSYLVANIA.

IMPROVEMENT IN PROCESSES FOR WATERPROOFING LEATHER AND OTHER FABRICS.

Specification forming part of Letters Patent No. 153,099, dated July 14, 1874; application filed June 10, 1874.

*To all whom it may concern:*

Be it known that I, ALEXANDER C. MC-KNIGHT, of Philadelphia, Pennsylvania, have invented an Improved Process for Waterproofing Leather, &c., of which the following is a specification:

My invention relates to an improved compound for treating leather to render it impervious to water.

Among the advantages attending its use are these, that it gives no unnatural color to the leather, and renders it capable of enduring as severe a strain or long-continued and hard use as when left in its natural state, whereas I have found, by experiment and test, that waterproofing compounds in general have the defect of discoloring and injuring the leather, so that it becomes liable to crack after short wear, even if it chance to possess or retain a good degree of softness and elasticity.

The first part of my invention consists of, say, one ounce of alum dissolved by heat in a pint of water. I then add one-half pound of wheat starch. When this is dissolved sprinkle in a few grains of iodine, and then add one pint of oil, which forms a dark pasty mass. The oil has not yet combined with the mass, but by adding a small quantity of soda it becomes incorporated with the compound, changing the color from a dark purple to a light yellow or orange. The second part of my invention consists of what is known among dyers as "acetate of alumina". One pound of alum is dissolved in a gallon of water. In another vessel one-half pound of sugar of lead in a half gallon of water. The latter is added to the alum at a boiling heat and well stirred. The sulphuric acid combines with the lead, which falls to the bottom as a heavy white precipitate. The clear liquor is then drawn off and is ready for use. My process for rendering leather, &c., water-repellent is to dissolve by heat about two ounces of my first preparation in about a gallon of water. Soak the goods in this from six to eight hours; then dry. When perfectly dry immerse them in a bath of the second preparation for about eight hours. When taken from this second bath and thoroughly dried the goods will be found to resist moisture and dampness to a far greater extent than before treatment.

I do not wish to confine myself to the exact proportions as given above, as slight modifications or alterations may be required in treating different kinds of material. For instance, some leather may require more oil in the first preparation, and other leather, (sole, for instance,) less.

In making the first preparation the process may be expedited by using a little soap, as it then does not require so long boiling as when oil alone is used.

I claim—

1. The chemical compound for rendering leather water-proof, consisting of iodine, wheat starch, alum, oil, and soda, combined in substantially the proportions and in the manner specified.

2. The combination, with the compound for preliminary treatment of the leather, of acetate of alumina for perfecting the treatment, the same being composed of the ingredients named, and in proportions specified.

ALEX. C. McKNIGHT.

Witnesses:
WM. McKNIGHT,
T. C. SMITH.